United States Patent [19]

Lamoine

[11] Patent Number: 4,501,479
[45] Date of Patent: Feb. 26, 1985

[54] DEVICE FOR SAFETY-LOCKING A COVER OF A HOUSING OF A MAGAZINE OF A CAMERA AND CAMERA IN WHICH SUCH A DEVICE IS UTILIZED

[75] Inventor: Pierre R. Lamoine, Ermont, France

[73] Assignee: U.S. Philips Corporation, New York, N.Y.

[21] Appl. No.: 486,753

[22] Filed: Apr. 20, 1983

[30] Foreign Application Priority Data

Apr. 23, 1982 [FR] France .............................. 82 07011

[51] Int. Cl.³ .............................................. G03B 17/26
[52] U.S. Cl. .................................. 354/275; 354/288; 292/181; 352/78 R
[58] Field of Search ............... 354/174, 275, 281, 288; 352/72, 78 R; 292/179, 181, 182; 242/75.5

[56] References Cited

U.S. PATENT DOCUMENTS

| | | | |
|---|---|---|---|
| 2,347,732 | 5/1944 | Briechle et al. | 242/71.5 |
| 3,792,884 | 2/1974 | Tutikawa | 292/179 |
| 3,984,136 | 10/1976 | Bills | 292/182 |
| 4,179,143 | 12/1979 | Shy | 292/179 |
| 4,281,909 | 8/1981 | Ishibashi et al. | 354/288 |
| 4,306,795 | 12/1981 | Lamoine | 352/78 R |
| 4,420,240 | 12/1983 | Katsuma et al. | 354/275 |

FOREIGN PATENT DOCUMENTS

722998 7/1942 Fed. Rep. of Germany .

Primary Examiner—A. A. Mathews
Attorney, Agent, or Firm—Robert S. Smith

[57] ABSTRACT

The invention is applied to a cover of a housing which is positioned by sliding into grooves provided for this purpose in the edges of the housing or of the cover. The invention consists in that the housing is provided on the inside with a shaft constituting the lock which is adapted to slide solely parallel to the lateral walls of the housing, in that the cover is provided with a recess situated opposite the shaft when the housing and the cover are joined together and, in order to obtain the locking of the cover, in that the shaft is caused to slide until one of its ends penetrates into the recess. Blocking means which can be automatically locked and can be unlocked are provided for holding the shaft of the lock in its locking position.

Application: for covers of housings of a magazine of a camera.

5 Claims, 4 Drawing Figures

DEVICE FOR SAFETY-LOCKING A COVER OF A HOUSING OF A MAGAZINE OF A CAMERA AND CAMERA IN WHICH SUCH A DEVICE IS UTILIZED

The invention relates to a device for safety-locking a cover of a housing or a casing, which cover is positioned on the housing by sliding into grooves provided for this purpose in the edges of the housing or of the cover.

The housing or the casing with a sliding cover utilizing the locking device according to the invention can be used for widely different applications, but the invention more particularly relates to housings (or drawers) for which safety means are required for various reasons and which must not be opened unintentionally during a clumsy manipulation or as a result of a shock. Examples are medicine-cupboards that must not be too easy to open by a child, or a casing of a magazine of a camera which, when charged with a film, must stay closed to light in order to prevent the unexposed or, which is even more regrettable, the exposed film from being blurred.

Most of the housings having a sliding cover do not comprise a safety lock, the friction between the cover and the body of the housing at their engagement areas being considered sufficient to prevent the cover from being untimely opened.

On the contrary, housings or casings having a sliding cover are known, such as the housing of a magazine of a camera described in French Utility model No. 2452727, for which a safety lock can be necessary. This locking is obtained, for example, by means of two captive screws with knurled head, whose non-threaded part passes through the cover and which is screwed into threaded holes provided for this purpose in the interior of the shafts of the supply and receiving spools. This solution ensures an effective protection from an untimely opening of the cover, but it is laborious and requires an excessively long manipulation.

The invention obviates the disadvantages of the prior art due to the fact that the safety-locking device described in the preamble is characterized in that it comprises a safety lock for the cover constituted by a shouldered shaft adapted to slide between two extreme positions inside the said housing against the action of a first release spring in a direction substantially perpendicular to the plane of the cover from a first extreme unlocking position a first end of which shaft can penetrate into a recess provided in the cover under the influence of a force exerted on the said shaft, blocking means being provided for automatically blocking the said shaft in a second extreme locking position in which its first end is received by the said recess when the stroke of the shouldered shaft in the said housing reaches a predetermined value.

Thus, an effective blocking of the cover in the sliding direction of the latter is obtained, which prevents it from being unlocked as a result of a pulling force or a shock to which the cover itself would be subjected.

In order that the safety of the locking be complete, it has also to be ensured that the access to the lock and especially to the second end of the shouldered shaft can only be obtained by an intentional intervention.

For this purpose, a preferred embodiment of the safety-locking device according to the invention is characterized in that the said second end of the shouldered shaft has a substantially conical form and in that this second end is flush with the plane of the wall of the housing opposite the cover in the said first extreme unclocking position, a first groove being provided in an edge of the housing opposite the cover in order to permit of obtaining a limited access to the said second end.

Another preferred embodiment of the invention is characterized in that the said blocking means are constituted by a toggle lever which under the influence of a second release spring is received by a notch in the lock provided for this purpose when this notch reaches its level, which establishes the said second extreme locking position.

Further, in order that the safety of the unlocking of the cover be complete, the access to the said blocking means must result only from an intentional intervention.

Therefore, another preferred embodiment of the locking device according to the invention is characterized in that the said blocking means can be unlocked with the aid of a second groove provided in an edge of the housing opposite the cover and giving a limited access to the free end of the said toggle lever.

In order that the invention may be readily carried out, it will now be described more fully with reference to the accompanying drawings, in which.

In the different Figures, the same reference symbols denote the same elements with the same functions.

Figure 1:
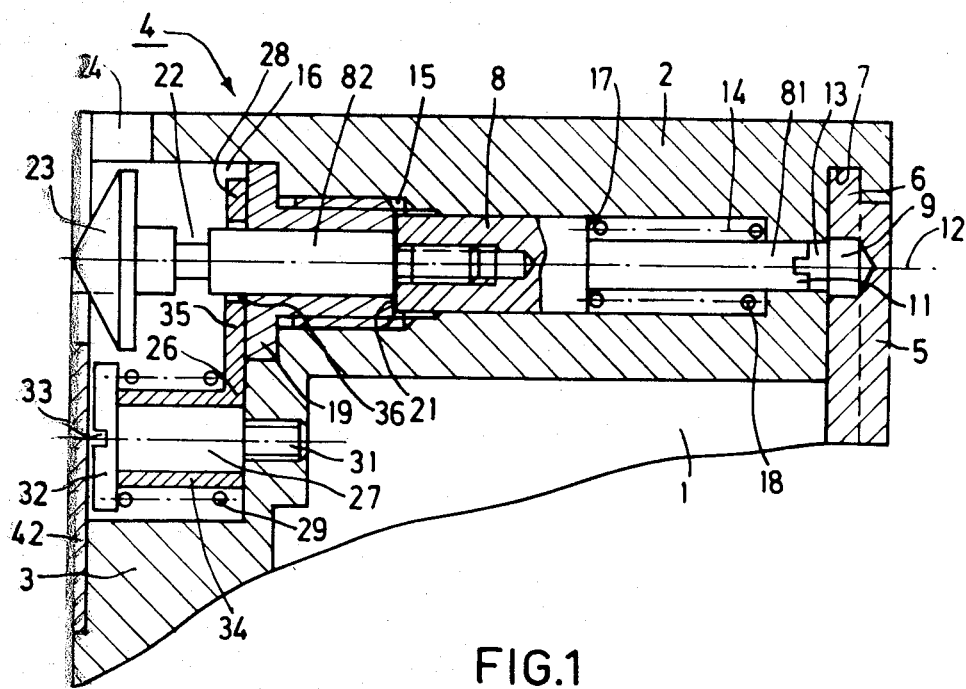
FIG. 1 is a broken away elevational view in partial section of an embodiment of the safety-locking device according to the invention.

FIG. 1 shows a housing or casing 4 constituted by two side walls, i.e. the wall 1, shown in partial plan view, and the wall 2, shown in sectional view, and by a wall 3 constituting the bottom, shown in sectional view. A cover 5 is joined to the housing 4 in sliding engagement so as to constitute its upper wall. For this purpose, at least two parallel edges of the cover, such as 6, which may be provided with grooves, are slid into grooves 7 formed in the upper edges of the housing. This joining procedure may be inverted, the grooves being formed in the direction of thickness in the edges of the cover in correspondence with furrows provided in the upper part of the edges of the housing. The general idea of the invention is to provide the housing on the inside with a shaft in the form of an elongated part, such as 8, constituting the lock and adapted to slide in a direction parallel to the side walls of the housing without a possible deflection in the other directions, to provide in the cover a recess 9 situated opposite the shaft when the housing and the cover are joined together and, in order to obtain the locking of the cover, to cause the shaft to slide until one of its ends 11 penetrates into the recess 9. The cover is then blocked in all the directions parallel to the plane of the cover and especially in the sliding direction of the cover on the housing.

In order to facilitate the locking described above, to ensure that this locking is safe and possibly to facilitate the unlocking, the following supplementary means are provided;

In order to maintain a satisfactory operation of the lock in the lateral direction, the latter is accommodated in the direction of thickness in the wall 2. This preferred embodiment is used especially for a housing of a magazine of a camera. The recess for the lock is constituted by a succession of bores or of threaded holes, the common axis 12 of which merges into the recess 9 of the mounted cover and the diameter of which increases from the upper part to the lower part of the housing. In the following order of succession, there are provided a bore 13, a bore 14, a threaded hole 15 and a bore 16. The lock 8 is constituted by two parts, i.e. an upper part 81 and a lower part 82, which can be assembled by screwing. The upper part 81 comprises two cylindrical coaxial shafts mutually separated by a shoulder 17 and adapted to enter with sliding fit the bores 13 and 14, respectively. A first release spring 18 bearing on the shoulder 17 is received by the bore 14. After the elements 18 and then 81 are positioned, a screw 19 provided with a bore at its centre is introduced into the threaded hole 15 and is screwed until its upper end bears on the lower surface 21 of the part 81 of the lock so that the spring 18 is slightly compressed. The lower part 82 of the lock is constituted by a cylindrical shaft which is provided with a notch 22 and whose end near the notch is constituted by a head 23, which is preferably flared and has a substantially conical shape and which is identical with the second or lower end of the lock 8. The part 82 enters with sliding fit the bore of the screw 19 and is screwed through its end remote from the threaded notch into the lower threaded end of the part 81. When the mounting of the lock 8 is terminated, the notch 22 is situated in the bore 16, while the conical head 23 is preferably flush with the lower surface of the wall 3. It should be noted that the lock 8 could be constituted by one piece on the condition that its lower end is not flared to a greater extent than the cylindrical shaft carrying it, or that the flared head 23 is secured by screwing. Preferably, the wall 2 has at its lower edge opposite the head 23 a first groove 24, which permits of obtaining a limited access at least to the conical part of the head 23. When a sufficient pressure is exerted on this conical part in the lateral or in the vertical direction, the lock 8 is displaced against the action of the spring 18 and the upper end 11 of the lock penetrates into the recess 9. In order to hold the lock in this locking position, blocking means are to be provided. These means are preferably constituted, as shown in FIG. 1, by a lever 26 pivotable about a shaft 27, whose free end 28 can be received by the notch 22 under the influence of a release spring 29, and are accommodated in a recess constituted by an enlarged part of the bore 16 obtained by subjecting the walls of the housing 4 to a suitable machining operation. The shaft 27 is constituted, for example, by the non-threaded shouldered part of the pin of a screw comprising a threaded part 31 and a head 32 provided with screwing means, i.e. a slot for a screwdriver 33, for example, for fixing the screw in the lower wall 3. The toggle lever 26 comprises an annular part 34 adapted to be slidably rotatable about the shaft 27, as well as an arm 35 integral with the part 34, the arm 35 comprising the free end 28. The arm 35 is supported at the level of a groove 36 by the part 82 of the lock by means of the second release spring 29 arranged to surround the part 34 of the toggle lever.

Figure 2:
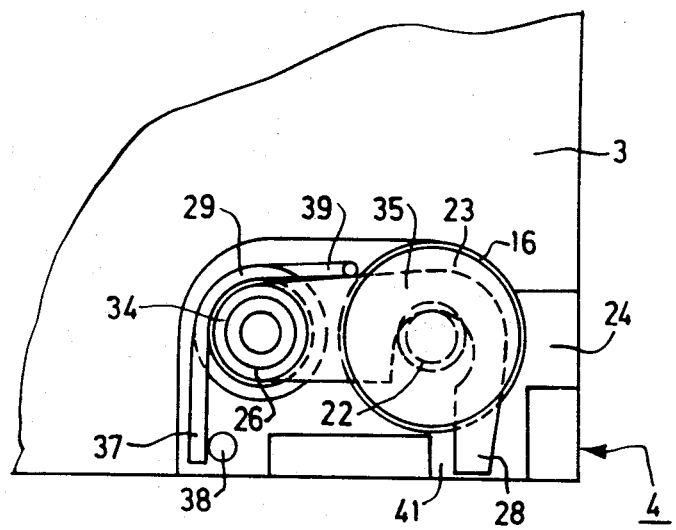
FIG. 2 is a partial bottom view of the embodiment of the safety-locking device of FIG. 1.

FIG. 2 indicates how the wall 3 can be machined and permits of understanding more clearly the operation of the release means. In FIG. 2, the arm 35 of the toggle lever is shown so as to be received by the notch 22, which permits of holding the lock 8 in its safety-locking position. For the sake of simplicity of the drawing, the rotary support screw of the toggle lever is not shown. The helical spring 29 comprises an end 37 which bears on a stud 38 fixed to the wall 3 and an end 39 which bears on the arm 35. The end 39 can be folded and can bear directly on the edge of the arm 35, as shown in FIG. 2, or can be rectilinear and can bear on a stud integral with the arm 35. A second groove 41 is preferably provided in an edge of the housing opposite the cover so that a limited access is obtained to the end 28 of the toggle lever. It should be noted (see FIG. 2) that the grooves 24 and 41 are provided in different edges of the housing 4. This is not absolutely necessary and the two grooves 24 and 41 may also be situated substantially beside each other in the same edge. In order to obtain the unlocking of the cover from the locking position shown in FIG. 2, it is sufficient to cause the cover to bear through the groove 41 on the end 28 of the lever, which results in that the arm 35 is pushed backwards against the action of the spring 29 and is released from the notch 22. The lock constituted by the elements 8 and 23 is then returned to its unlocking position shown in FIG. 1 under the influence of the release spring 18. The locking or unlocking is effected, for example, by means of the claw through the grooves 24 and 41.

The machining operations required for mounting and the required deflection of the different movable elements described above are preferably effected from one side, the axis of the various tools being in the present case parallel to the walls 1 and 2 of the casing. These machining operations comprise two punching operations, a threading operation, a breaking-up operation and a milling operation. The breaking-up operation and the milling operation effected in the wall 3 for accommodating the blocking means and for forming the grooves are effected, for example, by circumferential milling by means of a single cutter whose displacement is digitally controlled.

As a technical equivalent, the blocking means described above may alternatively be constituted in a manner not shown by a single piece in the form of an elastic arm, for example, a flexible leaf spring one part of which will be received under pressure by the notch 22. In the case in which the elastic arm has a circular cross-section, guiding means have to be provided at least on a part of its track in order to retain a sufficient rigidity in the axial direction, i.e. parallel to the axis of the lock. It is also possible to use blocking means which are displaced according to a translatory rectilinear movement under the influence of a helical release spring accommodated in an axial bore perpendicular to the axis of the lock.

As the case may be, a plate 42 (FIG. 1) fixed by any known means to the wall 3 covers in part the blocking means and/or the head 23 of the lock so that only the desired parts are left free for the access to the locking device.

Figure 3:
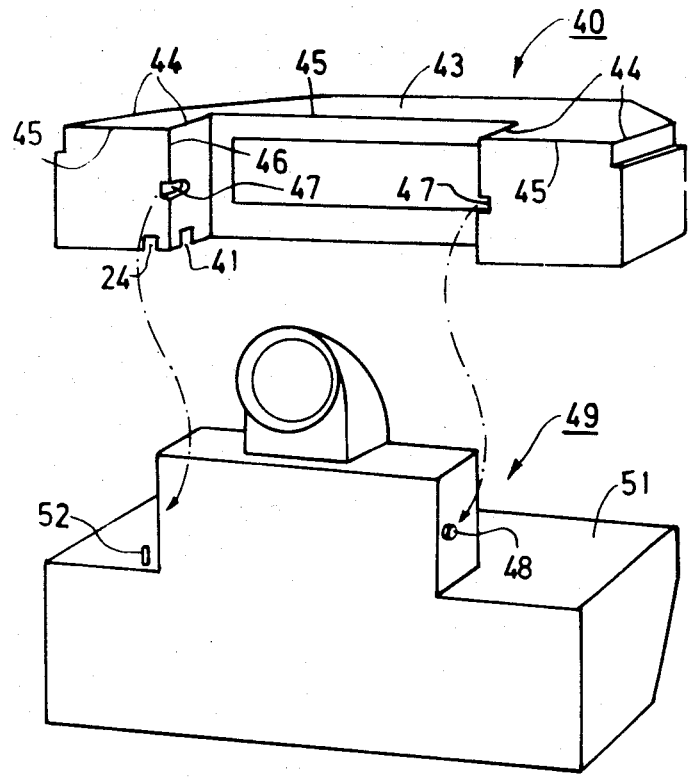
FIG. 3 is a perspective view a housing of a magazine of a camera and the camera in which it is to be utilized in accordance with the invention.
Figure 4:
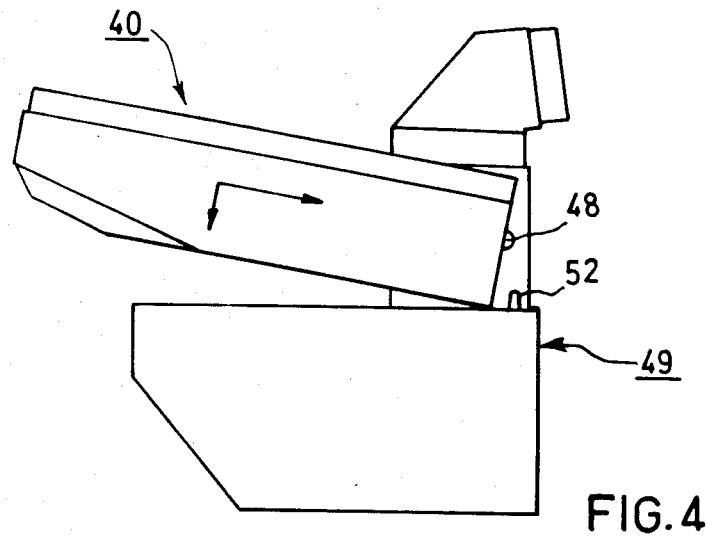
FIG. 4 is a side elevation of the housing of a magazine and the camera of FIG. 1 during the operation of joining the former to the latter.

The invention is preferably applied to a casing for a magazine of a camera, for example, as designated by 40 in the upper part of FIG. 3. The cover 43 is slidably mounted in grooves not shown in the drawing, provided in the upper lateral edges 44 of the casing. Preferably, the cover also penetrates into grooves provided in the upper front edges 45 of the casing, which permits of preventing light from entering at the level of the edges 45. In conditions in which the cover is in place, the only possible displacement is from the front to the back with respect to the casing. According to desire, this movement is made impossible due to the safety lock described above, which is accommodated in the walls of the casing, for example, so as to be recessed with respect to the vertical edge 46. The housing having, for example, the form of a U indicated in the drawing and passive anchorage points in forward direction constituted by slots 47 co-operating with lugs 48 on the body 49 of a camera having a complementary position with a view to the operation of joining together the magazine and the body of the camera, it can be ensured that the operation of locking the cover of the housing of the magazine is effected automatically during the positioning of the magazine on the body, on the assumption that the said locking operation has not been effected before this positioning, for example, with the aid of the claw or by means of a suitable tool if the access to the second end of the lock is very limited. For this purpose, the body of the camera comprises at an upper surface 51 a finger 52 arranged opposite the groove 24 when the housing of the magazine is placed against the body of the camera. As is shown in the side elevation of FIG. 4, the lugs 48 are preferably situated so as to be slightly recessed backwards with respect to the finger 51 so that at the instant at which the housing and the body are joined together the lugs 48 are already received by the slots 47 before the finger 51 comes into contact with the conical surface of the head 23 of the lock. The housing then being entirely pressed to the front, the finger 51 pushes the head 23 of the lock back until the arm 35 of the toggle lever penetrates into the notch 22, while the front part of the housing cannot return under the action of the release spring 18 of the lock as a result of the fact that this front part is held by the lugs 48 in the slots 47. It should be noted that the position chosen for the groove 41 (FIG. 3) is such that the cover 43 cannot possibly be unlocked when the magazine is in place on the body, the groove 41 then being inaccessible.

What is claimed is:

1. A safety-locking device for a cover and a housing, said cover including means for positioning the cover on the housing, said means for positioning including first edges on the cover and second edges on the housing, one of said first and second edges including grooves provided for cooperation with the other of said first and second edges, said device comprising a safety-lock for the cover constituted by a shouldered shaft, said shouldered shaft mounted to slide between two extreme positions inside the housing against the biasing force of a first release spring in a direction substantially perpendicular to a portion of the cover from a first extreme unlocking position, a first end of said shouldered shaft being dimensioned and configured to penetrate into a recess provided in the cover under the influence of a force exerted on said shaft, blocking means being provided for automatically blocking said shouldered shaft in a second extreme locking position, in which a first end is received by said recess when the travel of said shouldered shaft between said two extreme positions in the housing reaches a predetermined distance, a second end of said shouldered shaft having a substantially conical form, said second end being flush with a portion of the wall of the housing opposite the cover in the first extreme unlocking position, a first groove being provided in the edge of the housing opposite the cover in order that a limited access to the second end is obtained.

2. A safety-locking device as claimed in claim 1 wherein said blocking means comprises a toggle lever having a pivot end and a free end, said toggle level being biased by a second release spring into a notch when said notch reaches a predetermined position, said predetermined position constituting the second extreme locking position.

3. A safety-locking device as claimed in claim 2, wherein said blocking means is unlocked by means of a second groove provided in the edge of the housing opposite the cover and giving a limited access to the free end of the toggle lever.

4. A magazine for a camera in which the safety-locking device as claimed in claims 1 or 3 is used, characterized in that the said lock and the said blocking means are accommodated in the direction of thickness in the walls of the housing of the magazine.

5. A camera in which a magazine is used as claimed in claim 4 and in which the body and the magazine comprise in forward direction, for obtaining a passive anchorage, lugs on the former which co-operate with positioning slots of complementary form on the latter, characterized in that the body of the camera comprises at an upper surface a finger arranged opposite the lock of the magazine so that after the lugs have been introduced into the slots during the positioning of the magazine on the body the said finger pushes the second end of the shaft of the lock back until the safety-locking of the cover of the magazine is obtained.

* * * * *

UNITED STATES PATENT AND TRADEMARK OFFICE
CERTIFICATE OF CORRECTION

PATENT NO. : 4,501,479
DATED      : February 26, 1985
INVENTOR(S): Pierre R. Lamoine It is certified that error appears in the above-identified patent and that said Letters Patent is hereby corrected as shown below:

Claim 4, line 2    change "1 or 3" to --1, 2, or 3--

Signed and Sealed this

Twenty-eighth Day of February, 1989

Attest:

DONALD J. QUIGG

Attesting Officer    Commissioner of Patents and Trademarks